UNITED STATES PATENT OFFICE.

CHARLEY MARION HULSEY, OF FROST, TEXAS.

COMPOSITION FOR KILLING GRASS.

No. 821,244.   Specification of Letters Patent.   Patented May 22, 1906.

Application filed September 5, 1905. Serial No. 277,061.

*To all whom it may concern:*

Be it known that I, CHARLEY MARION HULSEY, a citizen of the United States, residing at Frost, in the county of Navarro and State of Texas, have invented new and useful Improvements in Compositions for Killing Grass, of which the following is a specification.

This invention relates to an improved composition for killing grass, weeds, or other kinds of noxious growths.

The composition consists of the following ingredients combined in substantially the proportions stated: kerosene-oil, twenty gallons; soda, two pounds; alum, two tablespoonfuls; citric acid, one teaspoonful. After the ingredients have been thoroughly mixed the composition is allowed to stand for about thirty-six hours. It may then be sprayed or sprinkled on the growing grass, weeds, or other character of plants. In about twenty minutes after spraying the grass with my composition the grass will turn dark and will readily separate at the joints and may be easily removed with a rake or other implement without its being necessary to cut the grass. Furthermore, the composition when applied to growing plants or grass has the effect of producing sourness in the roots, killing them as deep as they grow in the ground, and leaving only the outer husk. I find the composition very efficacious and expeditious in killing grass, all forms of weeds, and other objectionable plants, and especially is the composition useful in absolutely destroying what is known in Texas and other parts of the South as "Johnson grass," which has heretofore resisted all attempts at eradication and the destruction of which is very desirable.

Having thus fully described my invention, what I claim as new, and desire to secure by Letters Patent, is—

1. A composition for killing grass, weeds and the like, consisting of kerosene-oil, soda, alum and citric acid.

2. The herein-described composition for killing grass, weeds and the like, consisting of kerosene-oil, soda, alum and citric acid mixed in substantially the proportions stated.

In testimony whereof I have hereunto set my hand in presence of two subscribing witnesses.

his
CHARLEY MARION X HULSEY.
      mark

Witnesses:
 G. E. RAMSEY,
 J. E. LATTIMORE.